(12) United States Patent
Knerr et al.

(10) Patent No.: US 11,352,521 B2
(45) Date of Patent: *Jun. 7, 2022

(54) MAGNET WIRE WITH CORONA RESISTANT POLYAMIDEIMIDE INSULATION

(71) Applicant: Essex Furukawa Magnet Wire USA LLC, Atlanta, GA (US)

(72) Inventors: Allan R. Knerr, Fort Wayne, IN (US); Gregory S. Caudill, Fort Wayne, IN (US); Vanessa Jean Scott, Ossian, IN (US); David Mykel Geng, Avilla, IN (US)

(73) Assignee: Essex Furukawa Magnet Wire USA LLC, Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/316,333

(22) Filed: May 10, 2021

(65) Prior Publication Data

US 2021/0261817 A1 Aug. 26, 2021

Related U.S. Application Data (63) Continuation-in-part of application No. 17/003,503, filed on Aug. 26, 2020, now Pat. No. 11,004,575, which is a continuation-in-part of application No. 16/403,665, filed on May 6, 2019, now Pat. No. 10,796,820.

(60) Provisional application No. 62/667,649, filed on May 7, 2018.

(51) Int. Cl.
*H01B 3/02* (2006.01)
*C09D 179/08* (2006.01)
(Continued)

(52) U.S. Cl.
CPC ......... *C09D 179/08* (2013.01); *C09D 167/00* (2013.01); *H01B 3/305* (2013.01);
(Continued)

(58) Field of Classification Search
CPC ... H01B 7/02; H01B 7/04; H01B 7/06; H01B 7/2813; H01B 3/305; H01B 3/306
(Continued)

(56) References Cited

U.S. PATENT DOCUMENTS

| | | | | |
|---|---|---|---|---|
| 3,554,984 A | * | 1/1971 | Edwards et al. | C08G 73/14 528/350 |
| 4,273,829 A | * | 6/1981 | Perreault | H01B 7/0275 174/110 FC |

(Continued)

FOREIGN PATENT DOCUMENTS

WO 2017/042159 3/2017

OTHER PUBLICATIONS

Notification of Transmittal of the International Search Report and the Written Opinion of the International Searching Authority, or the Declaration for PCT/US2019/030804, dated Aug. 27, 2019.

*Primary Examiner* — William H. Mayo, III (57) ABSTRACT

Magnet wire with corona resistant enamel insulation may include a conductor, and at least one layer of polymeric enamel insulation may be formed around the conductor. The polymeric enamel insulation may include a filler dispersed in a base polyamideimide material. The filler may include between 20 percent and 80 percent by weight of silica dioxide and between 20 and 80 percent by weight of titanium dioxide. Additionally, the polymeric enamel insulation may have a thermal index of at least 230° C. and a thermal index that is at least twice that of the base polymeric material.

20 Claims, 3 Drawing Sheets

(51) Int. Cl.
  *H01B 3/30* (2006.01)
  *C09D 167/00* (2006.01)
  *C08K 3/22* (2006.01)
  *H01F 27/32* (2006.01)
  *C08K 3/36* (2006.01)
  *H02K 3/30* (2006.01)

(52) U.S. Cl.
  CPC ............... *C08K 3/22* (2013.01); *C08K 3/36* (2013.01); *C08K 2003/2241* (2013.01); *H01F 27/32* (2013.01); *H02K 3/30* (2013.01)

(58) Field of Classification Search
  USPC .... 174/110 R–110 N, 120 R, 120 SR, 121 R, 174/121 SR
  See application file for complete search history.

(56) References Cited

U.S. PATENT DOCUMENTS

| | | |
|---|---|---|
| 4,430,384 A | 2/1984 | George |
| 4,447,797 A * | 5/1984 | Saunders ............... H01B 3/40 336/205 |
| 4,537,804 A | 8/1985 | Keane |
| 4,597,804 A * | 7/1986 | Imaoka ............... H01L 21/3225 257/565 |
| 4,760,296 A * | 7/1988 | Johnston ............... C08K 3/36 174/127 |
| 4,935,302 A | 6/1990 | Hjortsberg |
| 5,654,095 A * | 8/1997 | Yin ............... H02K 3/30 174/11 OR |
| 5,861,578 A | 1/1999 | Hake et al. |
| 6,100,474 A | 8/2000 | McGregor et al. |
| 6,136,436 A | 10/2000 | Kennedy |
| 6,337,442 B1 * | 1/2002 | Lienert ............... C09D 179/08 174/120 R |
| 6,403,890 B1 | 6/2002 | McGregor et al. |
| 6,437,249 B1 * | 8/2002 | Higashiura ............... H01B 3/427 174/120 R |
| 7,253,357 B2 * | 8/2007 | Cipelli ............... H01B 3/306 174/11 OR |
| 2002/0142161 A1 | 10/2002 | Grimes |
| 2005/0118422 A1 * | 6/2005 | Cipelli ............... H01B 3/306 428/375 |
| 2012/0080970 A1 | 4/2012 | Yin |
| 2012/0285724 A1 * | 11/2012 | Oya ............... H01B 3/427 174/120 C |

* cited by examiner

MAGNET WIRE WITH CORONA RESISTANT POLYAMIDEIMIDE INSULATION

CROSS-REFERENCE TO RELATED APPLICATION

This application is a continuation-in-part of U.S. patent application Ser. No. 17/003,503, filed Aug. 26, 2020 and entitled "Magnet Wire with Corona Resistant Polyimide Insulation", which is a continuation-in-part of U.S. patent application Ser. No. 16/403,665, filed May 6, 2019 and entitled "Magnet Wire with Corona Resistant Polyimide Insulation", which claims priority to U.S. Provisional Application No. 62/667,649, filed May 7, 2018 and entitled "Corona Resistant Polyimide Magnet Wire Insulation". The contents of each of these prior matters is incorporated by reference herein in its entirety.

TECHNICAL FIELD

Embodiments of the disclosure relate generally to magnet wire and, more particularly, to magnet wire that includes insulation formed from corona resistant polyamideimide designed to improve the life and thermal conductivity of motor windings.

BACKGROUND

Magnet wire, also referred to as winding wire or magnetic winding wire, is utilized in a wide variety of electric machines and devices, such as inverter drive motors, motor starter generators, transformers, etc. Magnet wire typically includes polymeric enamel insulation formed around a central conductor. The enamel insulation is formed by applying a varnish onto the magnet wire and curing the varnish in an oven to remove solvents, thereby forming a thin enamel layer. This process is repeated until a desired enamel build or thickness has been attained. Polymeric materials utilized to form enamel layers are intended for use under certain maximum operating temperatures. Additionally, electrical devices may be subject to relatively high voltage conditions that may break down or degrade the wire insulation. For example, an inverter may generate variable frequencies that are input into certain types of motors, and the variable frequencies may exhibit steep wave shapes that cause premature motor winding failures.

Attempts have been made to reduce premature failures as a result of degradation of the wire insulation. These attempts have included minimizing damage to the wire and insulation during handling and manufacture of electric machines and devices, and using shorter lead lengths where appropriate. Further, a reactor coil or a filter between an inverter drive and a motor can extend the life of the windings by reducing the voltage spikes and high frequencies generated by the inverter drive/motor combination. However, such coils are expensive and add to the overall cost of the system. Increasing the amount of insulation can improve the life of the windings in an electrical device, but this option is both expensive and decreases the amount of space for the copper in the device, thereby producing a less efficient motor. Additionally, inter layer delamination may occur once a certain number of enamel layers has been reached. Therefore, there is an opportunity for improved magnet wire with insulation designed to withstand higher temperatures and/or voltages present within electrical devices for longer periods of time.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items; however, various embodiments may utilize elements and/or components other than those illustrated in the figures. Additionally, the drawings are provided to illustrate example embodiments described herein and are not intended to limit the scope of the disclosure.

FIGS. 1A-2B illustrate cross-sectional views of example magnet wire constructions that may be formed in accordance with various embodiments of the disclosure.

DETAILED DESCRIPTION

Certain embodiments of the present disclosure are directed to magnet wire that includes polyamideimide ("PAI") insulation having improved corona resistance, thermal conductivity, and/or thermal life enhancement relative to conventional magnet wire with polyamideimide insulation. Other embodiments of the disclosure are directed to methods of making magnet wire that includes PAI insulation having improved corona resistance, thermal conductivity, and/or thermal life enhancement. According to an aspect of the disclosure, filler material may be added to a PAI polymer or resin. Additionally, the filler material may include a blend of at least titanium(IV) oxide ($TiO_2$) (also referred to as titanium dioxide) and silica dioxide ($SiO_2$) (also referred to as silica). A blend may additionally include other suitable materials as desired, such as chromium dioxide ($CrO_2$). The addition of the filler may improve the corona resistance and/or thermal life of an enamel layer formed from filled PAI on a magnet wire. As a result, the life of the magnet wire and/or an electrical device (e.g., motor, etc.) incorporating the magnet wire may be increased or extended under partial discharge and/or other adverse conditions. The addition of the filler may also improve the thermal conductivity of the magnet wire. In particular, the filler may facilitate enhanced heat dissipation from the conductor. Additionally, one or more additives may be incorporated into the PAI insulation along with the filler material. At least one additive may include an amine moiety reacted with an aldehyde. For example, a Cymel material may be utilized as an additive. The one or more additives may serve a wide variety of purposes, such as promoting adhesion between components and/or layers of a magnet wire, enhancing the flexibility of the filled polymeric insulation, improving moisture resistance of the magnet wire, and/or improving heat resistance.

Filler material may be added to PAI at any suitable ratio. For example, in certain embodiments, a total amount of filler in a filled PI enamel insulation layer may be between approximately fifteen percent (15%) and approximately thirty-five percent (35%) by weight. In other embodiments, a total amount of filler may be between approximately twenty percent (20%) and approximately thirty percent (30%) by weight. For example, a total amount of filler may be approximately twenty-five percent (25%) by weight in certain embodiments. In various other embodiments, a total amount of filler may be approximately 5, 7.5, 10, 12.5, 15, 17.5, 20, 25, 30, 35, 40, 45, or 50 percent by weight, an amount included in a range between any two of the above values, or an amount included in a range bounded on either a minimum or maximum end by one of the above values.

Further, a wide variety of blending or mixing ratios may be utilized for various components incorporated into a filler. For example, titanium dioxide and silica dioxide may be blended at a wide variety of suitable ratios by weight. In various embodiments, a filler may include between approximately twenty percent (20%) and approximately eighty percent (80%) by weight of silica dioxide and between approximately twenty percent (20%) and approximately eighty (80%) by weight of titanium dioxide. For example, a filler may include 15-35% by weight of silica dioxide and 65-85% by weight of titanium dioxide. As another example, a filler may include 20-40% by weight silica dioxide and 60-80% by weight of titanium dioxide. A wide variety of other suitable blending ratios may be utilized as desired.

Embodiments of the disclosure now will be described more fully hereinafter with reference to the accompanying drawings, in which certain embodiments of the disclosure are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1A:
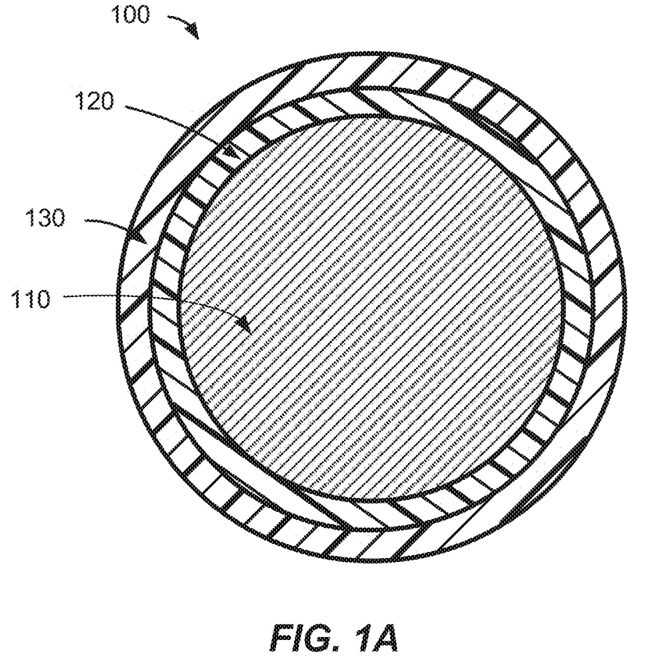

Referring now to the drawings, FIG. 1A shows a cross-sectional end-view of an example round magnet wire 100, which may include a conductor 110 coated with enamel insulation. Any suitable number of enamel layers may be utilized as desired. As shown, a plurality of layers of enamel insulation, such as a basecoat 120 and a topcoat 130, may be formed around the conductor 110. In other embodiments, a single layer of enamel insulation may be utilized. In yet other embodiments and as described in greater detail below with reference to FIGS. 2A and 2B, more than two layers of enamel insulation may be utilized. For example, a magnet wire may include a basecoat enamel layer, a midcoat enamel layer, and a topcoat enamel layer. Further, one or more of the enamel layers may include a suitable inorganic filler, and the filler may include a combination of silica dioxide and titanium dioxide.

Figure 1B:
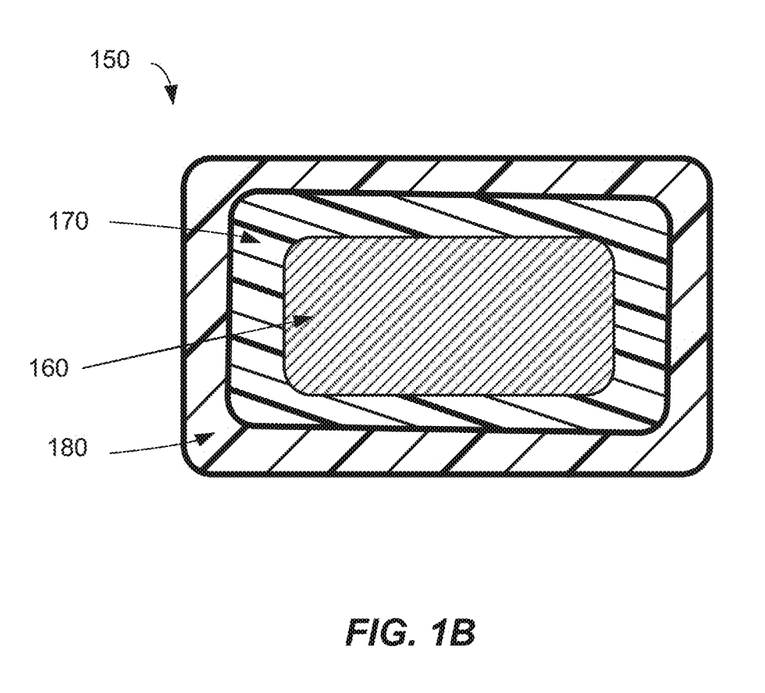

Similarly, FIG. 1B shows a cross-sectional end-view of an example rectangular magnet wire 150, which may include a conductor 160 coated with enamel insulation. Any suitable number of enamel layers may be utilized as desired. As shown, a plurality of layers of enamel insulation, such as a basecoat 170 and a topcoat 180, may be formed around the conductor 160. In other embodiments, a single layer of enamel insulation may be utilized. In yet other embodiments and as described in greater detail below with reference to FIGS. 2A and 2B, more than two layers of enamel insulation may be utilized. For example, a magnet wire may include a basecoat enamel layer, a midcoat enamel layer, and a topcoat enamel layer. Further, one or more of the enamel layers may include a suitable inorganic filler, and the filler may include a combination of silica dioxide and titanium dioxide. The round wire 100 of FIG. 1A is described in greater detail below; however, it will be appreciated that various components of the rectangular wire 150 of FIG. 1B may be similar to those described for the round wire 100 of FIG. 1A.

The conductor 110 may be formed from a wide variety of suitable materials or combinations of materials. For example, the conductor 110 may be formed from copper, aluminum, annealed copper, oxygen-free copper, silver-plated copper, nickel plated copper, copper clad aluminum ("CCA"), silver, gold, a conductive alloy, a bimetal, or any other suitable electrically conductive material. Additionally, the conductor 110 may be formed with any suitable cross-sectional shape, such as the illustrated circular or round cross-sectional shape. In other embodiments, a conductor 110 may have a rectangular (as shown in FIG. 1B), square, elliptical, oval, or any other suitable cross-sectional shape. As desired for certain cross-sectional shapes such as a rectangular shape, a conductor may have corners that are rounded, sharp, smoothed, curved, angled, truncated, or otherwise formed. The conductor 110 may also be formed with any suitable dimensions, such as any suitable gauge, diameter, height, width, cross-sectional area, etc.

Any number of layers of enamel, such as the illustrated basecoat 120 and topcoat 130, may be formed around the conductor 110. An enamel layer is typically formed by applying a polymeric varnish to the conductor 110 and then baking the conductor 110 in a suitable enameling oven or furnace. The polymeric varnish typically includes thermosetting polymeric material or resin suspended in one or more solvents. A thermosetting or thermoset polymer is a material that may be irreversibly cured from a soft solid or viscous liquid (e.g., a powder, etc.) to an insoluble or cross-linked resin. Thermosetting polymers typically cannot be melted for application via extrusion as the melting process will break down or degrade the polymer. Thus, thermosetting polymers are suspended in solvents to form a varnish that can be applied and cured to form enamel film layers. Following application of a varnish, solvent is removed as a result of baking or other suitable curing, thereby leaving a solid polymeric enamel layer. As desired, a plurality of layers of enamel may be applied to the conductor 110 in order to achieve a desired enamel thickness or build (e.g., a thickness of the enamel obtained by subtracting the thickness of the conductor and any underlying layers). Each enamel layer may be formed utilizing a similar process. In other words, a first enamel layer may be formed, for example, by applying a suitable varnish and passing the conductor through an enameling oven. A second enamel layer may subsequently be formed by applying a suitable varnish and passing the conductor through either the same enameling oven or a different enameling oven. Indeed, an enameling oven may be configured to facilitate multiple passes of a wire through the oven. As desired in various embodiments, other curing devices may be utilized in addition to or as an alternative to one or more enameling ovens. For example, one or more suitable infrared light, ultraviolet light, electron beam, and/or other curing systems may be utilized.

As desired, each layer of enamel, such as the basecoat 120 and the topcoat 130, may be formed with any suitable number of sublayers. For example, the basecoat 120 may include a single enamel layer or, alternatively, a plurality of enamel layers or sublayers that are formed until a desired build or thickness is achieved. Similarly, the topcoat 130 may include one or a plurality of sublayers. Each layer of enamel and/or a total enamel build may have any desired thickness, such as a thickness of approximately 0.0002, 0.0005, 0.007, 0.001, 0.002, 0.003, 0.004, 0.005, 0.006, 0.007, 0.008, 0.009, 0.010, 0.012, 0.015, 0.017, or 0.020 inches, a thickness included in a range between any two of the aforementioned values, and/or a thickness included in a range bounded on either a minimum or maximum end by one of the aforementioned values. Similarly, each layer of enamel and/or a total enamel build may have a thickness of approximately 5, 10, 15, 20, 25, 30, 35, 40, 45, 50, 60, 70, 75, 80, 90, 100, 125, 150, 175, 200, 225, 250, 275, 300, 325, 350, 375, 400, 425, 450, 475, or 500 micrometers, a thickness included in a range between any two of the aforementioned values, and/or a thickness included in a range bounded on either a minimum or maximum end by one of the aforementioned values. In certain embodiments, the example thickness values may apply to the thickness of an enamel layer or overall enamel system. In other embodiments, the example thickness values may apply to the build (e.g., a change in overall thickness of a wire resulting from addition of enamel, twice the thickness of an enamel layer or enamel system, the thickness on both sides of a wire resulting from the enamel layer or enamel system, etc.) of an enamel layer or overall enamel system. In yet other embodiments, the example thickness values provided above may be doubled in order to provide example build thickness values for an enamel layer or enamel system. Indeed, a wide variety of different wire constructions may be formed with enamel layers and/or insulation systems having any suitable thicknesses.

A wide variety of different types of polymeric materials may be utilized as desired to form an enamel layer. Examples of suitable thermosetting materials include, but are not limited to, polyimide, polyamideimide, amideimide, polyester, polyesterimide, polysulfone, polyphenylenesulfone, polysulfide, polyphenylenesulfide, polyetherimide, polyamide, polyketones, etc. According to an aspect of the disclosure, at least one enamel layer may include polyamideimide ("PAI"). In certain embodiments, a plurality of polyamideimide layers may be formed. For example, both the basecoat 120 and the topcoat 130 may be formed as PAI layers. In other embodiments, one or more PAI layers may be combined with enamel layers formed from other types of material. For example, the basecoat 120 may be formed from PAI while the topcoat 130 includes another polymeric material or blend of polymeric materials. As another example, the topcoat 130 may be formed from PAI while the basecoat 120 includes another polymeric material or blend of polymeric materials (e.g., polyester, polyimide, etc.) Additionally, according to an aspect of the disclosure and as explained in greater detail below, one or more PAI layers may include a suitable filler.

In certain embodiments, the basecoat 120 may include one or more layers of filled PAI, and an unfilled topcoat 130 that includes PAI may be formed over the basecoat 120. As desired, any suitable build or thickness ratio between the PAI basecoat 120 and the PAI topcoat 130 may be utilized. In certain embodiments, a thickness or build ratio between the PAI basecoat 120 and the PAI topcoat 130 may be between approximately 95/5 and approximately 80/20. In other words, the thickness or build of the PAI topcoat 130 may constitute between approximately 5.0 percent and approximately 20.0 percent of the overall thickness or build of the combined enamel insulation. In other embodiments, the topcoat 130 may constitute approximately 2, 3, 5, 7, 10, 12, 15, 20, or 25 percent of the overall thickness or build of the combined enamel insulation.

In other embodiments, at least one enamel layer may include polyimide ("PI"). In certain embodiments, a plurality of PI layers may be formed. For example, both the basecoat 120 and the topcoat 130 may be formed as PI layers. In other embodiments, one or more PI layers may be combined with enamel layers formed from other types of material. For example, the basecoat 120 may be formed from PI while the topcoat 130 includes another polymeric material (e.g., PAI) or blend of polymeric materials. As desired, one or more PI layers may include a suitable filler incorporated in a similar manner as that described herein for the filled PAI layers. Magnet wires that include filled PI layers are also described in greater detail in U.S. patent application Ser. Nos. 17/003,503 and 16/403,665, which are incorporated by reference herein in their entirety.

Figure 2A:
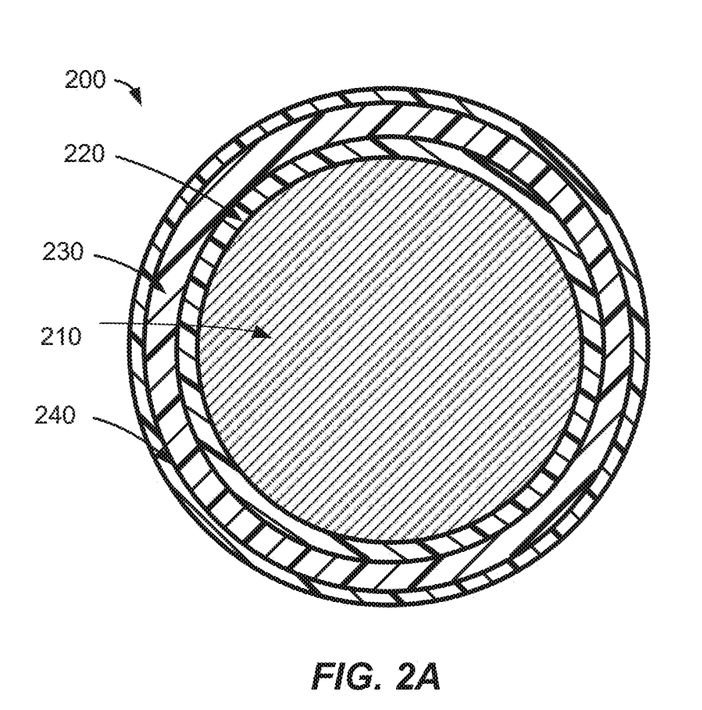
Figure 2B:
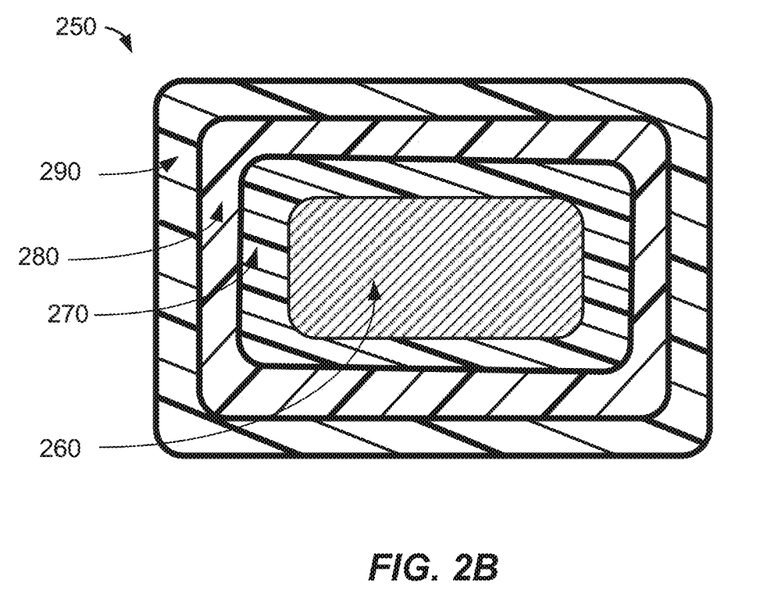

FIG. 2A shows a cross-sectional end-view of an example three-coat round magnet wire 200. The embodiment shown in FIG. 2A includes a conductor 210 surrounded by a polymeric basecoat 220, a first polymeric layer 230 disposed on the basecoat 220, and a second polymeric layer 240 disposed on the first polymeric layer 230. In certain embodiments, the first polymeric layer 230 may be referred to as a midcoat 230 and the second polymeric layer 240 may be referred to as a topcoat 240. Similarly, FIG. 2B shows a cross-sectional end-view of an example three-coat rectangular magnet wire 250. The wire 250 includes a conductor 260 surrounded by a polymeric basecoat 270, a first polymeric layer 280 (or midcoat 280) disposed on the basecoat 270, and a second polymeric layer 290 (or topcoat 290) disposed on the first polymeric layer 280. The round wire 200 of FIG. 2A is described in greater detail below; however, it will be appreciated that various components of the rectangular wire 250 of FIG. 2B may be similar to those described for the round wire 200 of FIG. 2A.

With respect to the wire 200 of FIG. 2A, the conductor 210 may be similar to the conductor 110 described above with reference to FIG. 1A. Additionally, a wide variety of suitable polymers may be utilized to form the various layers of enamel 220, 230, 240. Examples of suitable thermosetting materials include, but are not limited to, polyimide, polyamideimide, amideimide, polyester, polyesterimide, polysulfone, polyphenylenesulfone, polysulfide, polyphenylenesulfide, polyetherimide, polyamide, polyketones, etc. According to an aspect of the disclosure, at least one enamel layer may include polyamideimide ("PAI"). Additionally, each of the basecoat 220, first polymeric layer 230, and second polymeric layer 240 may include any desired number of sublayers.

In certain embodiments, a plurality of PAI layers may be formed. For example, all three layers 220, 230, 240 may be formed from PAI. In other embodiments, one or more PAI layers may be combined with enamel layers formed from other types of material. For example, the basecoat 220 may be formed from a first polymeric material, such as polyester, a polymeric material that promotes enhanced adhesion between the conductor 210 and the insulation formed around the conductor, etc. The first polymeric layer 230 or midcoat may then be formed from any suitable number of filled PAI layers. The second polymeric layer 240 may then be formed as a topcoat over the filled PAI layers. For example, the second polymeric layer 240 may be formed as an unfilled PAI topcoat similar to the topcoat 130 discussed above with reference to FIG. 1A.

In one example embodiment, a wire 200 may be formed with a three-layer insulation system. A basecoat 220 may be formed from a first polymeric material such as polyester. A midcoat 230 may be formed from filled PAI, and a topcoat 240 of unfilled PAI may be formed over the midcoat 230. Each of these layers 220, 230, 240 may include any suitable number of sublayers that are formed in order to achieve a desired layer thickness. In certain embodiments, the filled midcoat 230 may have a minimum thickness of approximately 19 micrometers or a minimum build (e.g., overall thickness added to the wire) of approximately 38 micrometers. This thickness can be reduced as the size of the wire falls below a desired threshold value. For example, for wire that is 25 AWG or smaller, the thickness of the filled PAI midcoat 230 may be reduced in order to provide reasonable thickness ratios. Indeed, the enamel thickness/build of a relatively small wire can decrease to as little as 10/20 micrometers respectively. At the same time, the filled layer can be sized such that it occupies a relatively large amount of the overall or total enamel thickness to maintain the integrity of the partial discharge resistant layer. For example, a filled midcoat layer may be sized to occupy at least 50, 55, 60, 65, 70, 75, or 80 percent of the enamel thickness.

In certain embodiments, the thickness of a filled PAI layer (or layers) relative to the other insulation layers (e.g., other enamel layers) or to the overall insulation thickness may result in improved insulation performance. In other words, when the filled PAI insulation occupies a sufficient level of the overall insulation thickness, a magnet wire 200 may exhibit desired performance (e.g., desired thermal index, desired thermal life, desired corona resistance, desired partial discharge inception voltage, etc.). In certain embodiments, the filled PAI enamel (e.g., a filled midcoat layer 230 in a three layer insulation system, etc.) may have a thickness that occupies at least 35% of the overall insulation thickness. In other embodiments, the filled PAI enamel may have a thickness that occupies at least 40% of the overall insulation thickness. In various other embodiments, the filled PAI enamel may have a thickness that occupies at least 30, 35, 40, 45, 50, 60, 70, 75, or 80% of the overall enamel thickness, or a thickness included in a range between any two of the above values.

In other embodiments, at least one enamel layer may include polyimide ("PI"). For example, a plurality of PI layers may be formed. As another example, a basecoat 220 may be formed from a first polymeric material (e.g., polyester, etc.), a midcoat 230 may be formed as a filled PI layer, and a topcoat 240 may be formed as an unfilled PAI layer. As another example, the basecoat 220 and the first polymeric layer 230 may both be formed as PI layers. For example, the basecoat 220 may be formed form PI that promotes enhanced adhesion to the conductor 210. In certain embodiments, the basecoat 220 may be formed from PI having a different formulation than PI used in the first polymeric layer 230. For example, the basecoat 220 may include PI formed by reacting a dianhydride component (e.g., pyrometllitic dianhydride or PMDA) with a diamine component that contains 2,2-bis[4-(4-aminophenoxy)phenyl] propane ("BAPP"). The first polymeric layer 230 or midcoat may include PI formed by reacting a dianhydride component with 4,4'-oxydianiline ("ODA"), and the first polymeric layer 230 may also be formed as a filled layer. The second polymeric layer 240 may then be formed as a topcoat over the filled PI layers. For example, the second polymeric layer 240 may be formed as a PAI topcoat similar to the topcoat 130 discussed above with reference to FIG. 1A.

Indeed, a wide variety of suitable combinations of enamel may be formed as desired from any suitable materials and/or combinations of materials. Additionally, similar to the wire 100 of FIG. 1A, in certain embodiments, the wire 200 of FIG. 2A may include at least one PAI layer that includes a suitable filler. In certain embodiments, one or more filled PAI layers may be formed around the conductor 210 (e.g., directly around the conductor 210, around one or more base layers, etc.). One or more unfilled layers or self-lubricating layers, such as an unfilled topcoat (e.g., an unfilled second polymeric layer 240), may then be formed around the one or more filled PAI layers. For example, an unfilled layer of PI or an unfilled layer of PAI may be formed over the one or more filled PAI layers. The unfilled layer(s) may assist in decreasing tooling wear associated with the abrasive materials utilized as fillers in the filled PAI layers. Additionally, although filled PAI layers are generally described herein, it will be appreciated that filled PI layers may be utilized as an alternative to filled PAI layers.

With continued reference to the wires 100, 150, 200, 250 of FIGS. 1A-2B, in certain embodiments, one or more suitable additives may be incorporated into one or more enamel layers. An additive may serve a wide variety of suitable purposes, such as promotion of adhesion between various components and/or layers of a wire, enhancing the flexibility of the insulation incorporated into a wire, enhancing moisture resistance, and/or promoting higher temperature stability. For example, an additive may function as an adhesion promoter to assist or facilitate greater adhesion between a conductor and a basecoat, as well as between the filler material(s) and the base polymeric material. As another example, an additive may function as an adhesion promoter to assist or facilitate greater adhesion between two different layers of enamel. As another example, an additive may enhance the flexibility of magnet wire insulation. A wide variety of suitable additives may be utilized as desired in various embodiments. In certain embodiments, an additive may be formed from or may include a material that is formed by reacting an amine moiety with an aldehyde material (e.g., a glyoxal material, a formaldehyde material, etc.). For example, a Cymel material or resin, such as Cymel materials manufactured and marketed by Allnex, may be utilized as an additive in conjunction with PAI (or PI in other embodiments). In other embodiments, a formaldehyde-free additive may be utilized. A suitable Cymel material or other additive may be utilized to facilitate greater adhesion between a PAI enamel layer and an underlying layer (e.g., a basecoat, a conductor, etc.) of a magnet wire, to bind the base PAI polymeric material to the filler material, and/or to enhance the flexibility of a PAI enamel layer and/or an overall insulation system. Other types of Cymel materials and/or crosslinking materials may be utilized as desired.

In other embodiments, one or more suitable surface modification treatments may be utilized on a conductor and/or any number of enamel layers to promote adhesion with a subsequently formed enamel layer. Examples of suitable surface modification treatments include, but are not limited to, a plasma treatment, an ultraviolet ("UV") treatment, a corona discharge treatment, and/or a gas flame treatment. A surface treatment may alter a topography of a conductor or enamel layer and/or form functional groups on the surface of the conductor or enamel layer that enhance or promote bonding of a subsequently formed enamel or other layer. In certain embodiments, the altered topography may also enhance or improve the wettability of a varnish utilized to form a subsequent enamel layer may altering a surface tension of the treated layer. As a result, surface treatments may reduce interlayer delamination.

As desired in certain embodiments, one or more other layers of insulation may be incorporated into a magnet wire 100, 150, 200, 250 in addition to a plurality of enamel layers. For example, one or more extruded thermoplastic layers (e.g., an extruded overcoat, etc.), semi-conductive layers, tape insulation layers (e.g., polymeric tapes, etc.), and/or conformal coatings (e.g., a parylene coating, etc.) may be incorporated into a magnet wire 100, 150, 200, 250. A wide variety of other insulation configurations and/or layer combinations may be utilized as desired. Additionally, an overall insulation system may include any number of suitable sublayers formed from any suitable materials and/or combinations of materials.

According to an aspect of the disclosure, one or more polyamideimide layers (and potentially other enamel layers)

may include a suitable filler. For example, one or more PAI enamel layers incorporated into a magnet wire, such as magnet wires 100, 150, 200, 250, may include a suitable filler. Additionally, in certain embodiments, the filler may include a blend of at least titanium dioxide ($TiO_2$) and silica dioxide ($SiO_2$). A blend of titanium dioxide and silica dioxide may additionally include other suitable materials as desired, such as chromium dioxide ($CrO_2$). In other embodiments, the filler may include a blend of at least chromium dioxide and silica dioxide. It should be noted, however, that while a chromium dioxide/silica dioxide blend was found to provide enhanced performance relative to unfilled enamel, it may not perform as well as a titanium dioxide/silica dioxide blend.

The addition of the filler may improve the corona resistance and/or thermal life of an enamel layer formed from filled PAI on a magnet wire. As a result, the life of the magnet wire and/or an electrical device (e.g., motor, etc.) incorporating the magnet wire may be increased or extended under partial discharge and/or other adverse conditions. In certain embodiments, the addition of the filler may also improve the thermal conductivity of a magnet wire 100, 150, 200, 250. Indeed, one or more filled PAI insulation layers may function to conduct or draw heat away from the conductor of a magnet wire 100, 150, 200, 250. As a result, the magnet wire 100, 150, 200, 250 may operate at a relatively lower temperature than conventional magnet wires that do not include filled insulation layers. For example, when utilized in an electric machine, the magnet wire 100, 150, 200, 250 and/or the electric machine may operate at a temperature that is approximately 5, 6, 7, 8, 9, 10, 11, or 12 degrees Centigrade lower than conventional devices that do not utilize filled insulation layers. This improved thermal conductivity may facilitate operation of magnet wire and/or electric machines at higher voltages, thereby improving output. In various embodiments, a filled PAI insulation layer may have a thermal conductivity that is at least 1.5, 2, 3, or 4 times that of an unfilled PAI insulation layer. In other words, a filled PAI insulation layer may have a first thermal conductivity that is at least 1.5, 2, 3, or 4 times that of a second thermal conductivity for the base PAI material into which filler is added.

Filler material may be added to PAI at any suitable ratio. For example, in certain embodiments, a total amount of filler in a filled PAI enamel insulation layer may be between approximately fifteen percent (15%) and approximately thirty-five percent (35%) by weight. In other embodiments, a total amount of filler may be between approximately fifteen percent (20%) and approximately twenty percent (30%) by weight. For example, a total amount of filler in a filled PAI enamel insulation layer may be approximately twenty-five percent (25%) by weight. In various other embodiments, a total amount of filler may be approximately 5, 7.5, 10, 12.5, 15, 17, 17.5, 20, 25, 30, 35, 40, 45, or 50 percent by weight, an amount included in a range between any two of the above values, or an amount included in a range bounded on either a minimum or maximum end by one of the above values. Substantial improvement in the life of windings was not observed at total filler levels much below about 5% by weight and, for certain magnet wire applications, insulation flexibility may be unacceptable as the filler percentage by weight is increased and exceeds a threshold value. For example, in certain applications, flexibility may be negatively impacted at total filler levels greater than about 50% based on weight.

A wide variety of blending or mixing ratios may be utilized for various components incorporated into a filler. For example, titanium dioxide and silica dioxide may be blended at a wide variety of suitable ratios by weight. In various embodiments, a filler may include between approximately twenty percent (20%) and approximately eighty percent (80%) by weight of silica dioxide and between approximately twenty percent (20%) and approximately eighty (80%) by weight of titanium dioxide. For example, a filler may include approximately 20, 25, 30, 33, 35, 40, 45, 50, 55, 60, 65, 67, 70, 75, or 80 percent by weight of silica dioxide, a weight percentage included in a range between any two of the above values (e.g., between 20% and 40%, etc.), or a weight percentage included in a range bounded on either a minimum or maximum end by one of the above values (e.g., at least 20%, etc.). Similarly, a filler may include approximately 20, 25, 30, 33, 35, 40, 45, 50, 55, 60, 65, 67, 70, 75, or 80 percent by weight of titanium dioxide, a weight percentage included in a range between any two of the above values (e.g., between 20% and 40%, etc.), or a weight percentage included in a range bounded on either a minimum or maximum end by one of the above values (e.g., at least 20%, etc.). Similar ratios may be utilized for blends of silica dioxide and chromium dioxide. As desired, a ratio of a first component (e.g., titanium dioxide, chromium dioxide, etc.) to a second component (e.g., silica dioxide) may be approximately 80/20, 75/25, 70/30, 67/33, 65/35, 60/40, 55/45, 50/50, 45/55, 40/60, 35/65, 33/67, 30/70, 25/75, 20/80, or any other suitable ratio.

As one example, titanium dioxide and silica dioxide may be blended at approximately a 75/25 ratio by weight. In other words, the filler may include approximately 75% titanium dioxide and approximately 25% silica dioxide by weight. In the event that a PAI enamel layer includes approximately 15.0% by weight of filler, then the PAI enamel layer may include approximately 11.25% by weight of titanium dioxide and approximately 3.75% by weight of silica dioxide. A wide variety of other filler ratios (e.g., ratio of filler within an enamel layer) and/or blending ratios (e.g., ratios of components utilized to make a filler) may be utilized as desired. For example, titanium dioxide and silica dioxide may be blended at approximately a 60/40 ratio by weight. The examples above are not intended to be limiting.

Additionally, in certain embodiments, the components utilized in a filler may be selected based upon one or more desired properties. For example, a first filler component (e.g., titanium dioxide, etc.) may be selected as an inorganic oxide having a relatively low resistivity and a second filler component (e.g., silica dioxide, etc.) may be selected as an inorganic oxide having a relatively large surface area. The mixture may then be added to PAI prior to formation of an enamel layer. In other words, a PAI layer may include a mixture of a large surface area inorganic oxide and a low resistivity inorganic oxide. A large surface area inorganic oxide is believed to permit more energy to penetrate through the insulation, thereby reducing the degradation of the insulation caused by high voltage and high frequency wave shapes in electrical devices. Silica dioxide or silica is commercially available in grades having a wide variety of specific surface areas, such as surface areas ranging from approximately 90 to approximately 550 $m^2/g$. For example, AEROSIL 90, available from Evonik Degussa Corporation, has a specific surface area of 90 $m^2/g$, and CAB-O-SIL EH-5, available from Cabot Corporation, has a specific surface area of 380 $m^2/g$. In certain embodiments, the resistance to the voltage wave shapes present in the windings of an electrical device may be improved with increasing silica surface area. Thus, silica grades having specific surface areas between approximately 380 $m^2/g$ and approximately 550 m²/g are preferred, or silica grades having specific surface areas greater than approximately 380 m²/g, 550 m²/g, or another threshold value may provide improved performance.

The components of a filler may include any suitable particle sizes, surface areas, and/or other dimensions. For example, a filler component may have a nominal particle size that is less than approximately one micron. In certain embodiments, a filler component may include nanoparticles. Additionally, a wide variety of suitable methods and/or techniques may be utilized to add a filler to a PAI polymer. In certain embodiments, a filler may be ball-milled or otherwise ground or milled in order to reduce agglomerates to below a desired amount, such as a Hegman gauge or grind of eight "eight" or finer. These are generally made at a higher concentration and can be reduced in the final "letdown" of the end formulation. As desired, the filler may be milled or ground until that particle size is below approximately 1.0 microns. Other particle sizes may be attained as desired. The filler may be incorporated into either a PAI resin, a carrier resin, or another resin to form a concentrated "paste" that will later be added to the PI enamel to produce the final formulation.

In certain embodiments, the filler may be milled directly into the PAI varnish in the presence of solvent. In other embodiments, the filler may be milled in another substance and then added to the PAI varnish. As desired, a PAI paste that includes the PAI polymer and the filler may be formed. In other embodiments, the filler may be milled or blended into another polymeric paste, and the polymeric paste may then be combined with PAI prior to application of an enamel layer. It will be appreciated that the addition of solvent during milling may keep the filler particles from re-agglomerating or clumping.

Once a filled paste has been dispersed in a PAI polymer, the PAI polymer may be applied to a conductor in any suitable manner. For example, the uncured PAI insulation may be applied to magnet wire using multi-pass coating and wiping dies followed by curing at an elevated temperature (e.g., curing in an enameling oven). Any desired number of PAI polymer layers may be incorporated into or formed on a magnet wire. In various embodiments, these PAI layers may be formed directly around a conductor or over one or more base layers (e.g., as a midcoat, etc.). Further, in certain embodiments, one or more layers (e.g., a polyamideimide topcoat, an extruded layer, etc.) may be formed over the PAI polymer layer(s).

A magnet wire 100, 150, 200, 250 that includes one or more filled PAI enamel layers may exhibit improved corona resistance, thermal conductivity, and/or thermal performance relative to conventional magnet wire enamels. For example, use of one or more filled PAI enamel layers may provide a thermal class, a thermal index, a temperature index, or a thermal endurance 230 magnet wire or higher. In certain embodiments, the anti-oxidant properties of some fillers may also result in obtaining filled PAI insulation having a thermal class, a thermal index, or a thermal endurance of 235 or greater. The addition of one or more unfilled topcoat layers (e.g., a PAI topcoat) may provide additional toughness and abrasion resistance without materially reducing the thermal class of the magnet wire. The thermal index of a magnet wire or magnet wire insulation layer is generally defined as a number in degrees Celsius that compares the temperature vs. time characteristics of an electrical insulation material. It may be obtained by extrapolating the Arrhenius plot of life versus temperature to a specified time, usually 20,000 hours. One test for measuring or determining the thermal index or thermal endurance of magnet wire is the ASTM D2307 test set forth by ASTM International. Conventional unfilled PAI typically has a thermal class of 220. Additionally, conventional inverter resistant wires that include filled PAI layers and a PAI topcoat have been measured to have thermal indexes of about 215 and, therefore, these wires qualify as a thermal class 200 material. By contrast, the thermal index of the inventive filled PAI enamel layers and magnet wires incorporating the filled PAI layers may be approximately 230 or greater. In various embodiments, the thermal index of may be approximately 225° C., 230° C., 235° C., or greater. In certain embodiments, these higher thermal indexes (e.g., a thermal index of 230 or greater) may apply to multi-layer wire constructions, such as constructions that include a polymeric basecoat (e.g., a polyester basecoat), a filled PAI midcoat, and a PAI topcoat. For example, the unique combination and amount of filler materials and/or the thickness ratios between the layers may result in a higher thermal index relative to conventional wires.

Further, the addition of one or more fillers to PAI may improve inverter duty life and/or electrical machine life without negatively affecting or ruining the thermal aging of the insulation. Indeed, in certain embodiments, the addition of one or more fillers may improve or raise the thermal life of magnet wire insulation at certain temperatures. For example, use of filled PAI insulation may result in a thermal life of greater than approximately 2,000, 3,000, or 3300 hours at approximately 260° C. By contrast, conventional unfilled PAI may have a thermal life of approximately 1,400 hours at approximately 260° C. A few examples illustrating positive results for filled PAI are set forth in Table 1 below.

TABLE 1

Thermal Life for Example Filled PAI Enamel Layers

| Conductor Size | Base Material | PAI Filler Loading | Filler Ratio | Thermal Life at 260° C. (hours) | Thermal Life at 280° C. (hours) |
|---|---|---|---|---|---|
| 16 AWG | PAI | 15% | 75% $CR_2O_3$ 25% $SiO_2$ | 2090 | 292 |
| 16 AWG | PAI | 15% | 75% $TiO_2$ 25% $SiO_2$ | 3391 | 343 |

The magnet wires 100, 150, 200, 250 described above with reference to FIGS. 1A-2B are provided by way of example only. A wide variety of alternatives could be made to the illustrated magnet wires 100, 150, 200, 250 as desired in various embodiments. For example, a wide variety of different types of insulation layers may be incorporated into a magnet wire 100, 150, 200, 250 in addition to one or more enamel layers. As another example, the cross-sectional shape of a magnet wire 100, 150, 200, 250 and/or one or more insulation layers may be altered. Indeed, the present disclosure envisions a wide variety of suitable magnet wire constructions. These constructions may include insulation systems with any number of layers and/or sublayers.

EXAMPLES

The following examples are intended as illustrative and non-limiting, and represent specific embodiments of the present invention. Unless otherwise stated, the wire samples discussed in the examples were all prepared as 16 AWG wire with a "heavy" enamel build. In other words, the wire enamels were applied to a 16 AWG copper wire using multi-pass coating and wiping dies. The "heavy" enamel build has a nominal insulation build of approximately 3.1 mils (0.077 mm).

Figure 3:
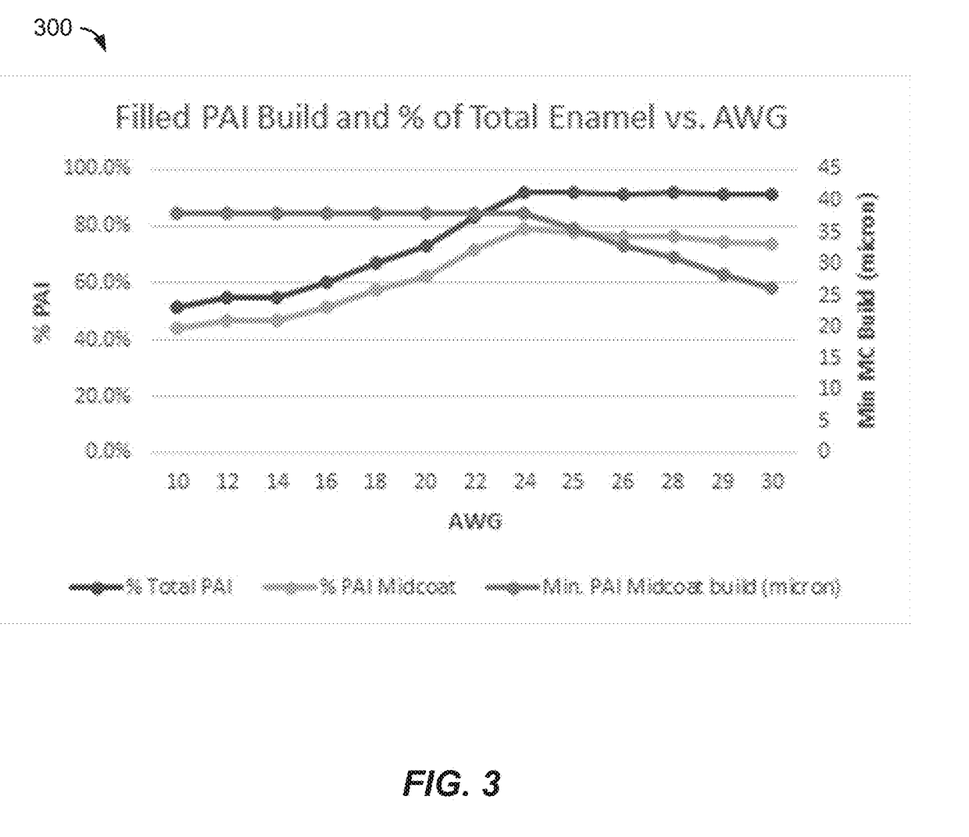
FIG. 3 illustrates example builds of filled enamel layers relative to total insulation thickness for various sizes of magnet wire in accordance with various embodiments of the disclosure.

A first example illustrated in the chart 300 of FIG. 3 depicts changing thicknesses of a filled PAI layer relative to overall insulation thickness as the conductor size changes. The example wires were formed with a three-layer enamel system including a basecoat, a filled PAI midcoat, and an unfilled PAI topcoat. For larger conductor sizes (illustrates as sizes between 10 AWG and 24 AWG), a minimum thickness of the filled PAI midcoat was maintained at 19 micrometers (or a 38 micrometer build). As the conductor size decreases from 10 AWG to 24 AWG, the percentage of the thickness of the filled PAI midcoat relative to overall insulation thickness increases. As the conductor size gets lower than 24 AWG (i.e., 25 AWG or smaller), the thickness of the filled PAI midcoat may be reduced to provide reasonable thickness ratios of wire enamel. It may not be practical to include a 19 micrometer filled PAI layer on a small magnet wire. At the same time, the respective filled PAI midcoat layers for each successively smaller wire sample (e.g., samples from 25 AWG to 30 AWG) occupy increasing percentages of the overall thickness. In other words, for smaller wire sizes, the filled PAI midcoat layers may be sized to occupy a suitable percentage of the overall insulation thickness in order to provide desired partial discharge and corona resistance performance.

A second example illustrated in Table 2 below depicts measured mechanical abrasion performance for example wires that include different filler materials. Each of the example wires was formed with a 16 AWG conductor size with a three-layer insulation system. In particular, the insulation system for each wire included a filled PAI midcoat layer. However, first wire samples included PAI filled with a combination of chromium dioxide and silica dioxide while second wire samples included PAI filled with a combination of titanium dioxide and silica dioxide. The samples included similar weight percentages of overall filler and the various components of each filler were blended at similar rates. In order to test the abrasion resistance of wire samples, a unilateral scrape test was employed to replicate the scrape forces that might be imparted on a magnet wire when it is pulled and incorporated into an electrical device. In the test, a weighted stylus is dragged along the wire and the abrasive force at which the insulation is compromised is measured. Tests were performed at different cure levels for the enamel and ranges of values are included in Table 2.

TABLE 2

Abrasion Resistance for Wire Samples

| Conductor Size | Base Material | PAT Filler Loading | Filler Ratio | Unilateral Scrape Resistance (grams) |
|---|---|---|---|---|
| 16 AWG | PAI | 15% | 75% $CR_2O_3$ 25% $SiO_2$ | 1800-2100 |
| 16 AWG | PAI | 15% | 75% $TiO_2$ 25% $SiO_2$ | 2300-2500 |

As shown in Table 2, the filler material utilized in a filled PAI layer can have an influence on the resistance of an insulation system to mechanical abrasion. This abrasion resistance can impact the ability of a magnet wire to properly perform without failure as it is formed into windings and inserted into slots within a motor stator, or otherwise incorporated into an electrical machine. As shown, the use of titanium dioxide as a filler material provided improved abrasion resistance as compared to the use of chromium dioxide as a filler material. Titanium dioxide includes surfaces that are less rough than chromium dioxide. The combination of silica dioxide as a filler material is not believed to materially alter the overall abrasiveness of the filler blends.

A third example set forth in Table 3 compares various fillers and filler levels that may be added to PAI. Table 2 illustrates the effects of adding fillers containing titanium dioxide, chromium dioxide, and/or silica dioxide in PAI enamel. Different filler materials were added at various blend ratios and filler weight percentages and the impacts on partial discharge resistance, voltage endurance, and film flexibility were evaluated.

TABLE 3

Comparative Filled PAI Samples

| Base Material | PAI Filler Loading | Filler Ratio | Filled PAI Thickness Ratio to Overall Insulation Thickness | Voltage Endurance Minutes @ 120° C. | NEMA Flex | Heat Shock @ 240° C. |
|---|---|---|---|---|---|---|
| PAI | 15% | 75% $CR_2O_3$ 25% $SiO_2$ | 35% | 315 | Pass | Pass |
| PAI | 15% | 75% $CR_2O_3$ 25% $SiO_2$ | 47% | 399 | Pass | Pass |
| PAI | 15% | 75% $Ti_2O_2$ 25% $SiO_2$ | 35% | 408 | Pass | Pass |
| PAI | 15% | 75% $Ti_2O_2$ 25% $SiO_2$ | 47% | 397 | Pass | Pass |
| PAI | 25% | 75% $Ti_2O_2$ 25% $SiO_2$ | 35% | 814 | Pass | Pass |
| PAI | 25% | 75% $TiO_2$ 25% $SiO_2$ | 47% | 1314 | Pass | Pass |
| PAI | 25% | 38% $CR_2O_3$ 38% $TiO_2$ 25% $SiO_2$ | 47% | 1040 | Pass | Pass |

As shown in Table 3, filled PAI layers that include blends of titanium dioxide, silica dioxide, and/or chromium dioxide may exhibit improved voltage endurance performance. Additionally, a blend of titanium dioxide and silica dioxide may exhibit improved performance relative to a blend of chromium dioxide and silica dioxide. As the loading level or weight percentage of filler material is altered within a PAI layer, a relatively optimal loading level may be identified that provided enhanced voltage endurance and partial discharge endurance without unacceptable impact to the flexibility of the insulation.

For each of the examples in Table 3, a filled PAI enamel was evaluated as a midcoat layer in a three-layer enamel insulation system on a 16 AWG copper conductor. The partial discharge resistance was measured by accelerated life test of enameled wire twisted pairs using a voltage endurance test operating at 120° C. ambient temperature, 3,500 VAC @ 60 Hz. The various magnet wires were tested at Essex's Magnet Wire Testing Laboratory using the voltage endurance test method. Typical dielectric twisted pairs were made from the wire and placed in an oven at 120° C. A high voltage power supply is configured to produce 3,500 VAC at 60 Hz and is connected to each of the twisted pairs. The twisted pairs, which each had about the same length, were monitored until a short circuit occurred and the time to short circuit was then recorded. The longer the time to short circuit (failure), the better the resistance to insulation degradation due to partial discharge.

Additionally, although the samples included in Tables 1-3 and FIG. 3 provide for specific blend ratios and overall fill rates (e.g., approximately 15% to 25% by weight of the insulation, etc.), a wide variety of other suitable blend ratios and/or fill rates may be utilized in other embodiments.

Conditional language, such as, among others, "can," "could," "might," or "may," unless specifically stated otherwise, or otherwise understood within the context as used, is generally intended to convey that certain embodiments could include, while other embodiments do not include, certain features, elements, and/or operations. Thus, such conditional language is not generally intended to imply that features, elements, and/or operations are in any way required for one or more embodiments or that one or more embodiments necessarily include logic for deciding, with or without user input or prompting, whether these features, elements, and/or operations are included or are to be performed in any particular embodiment.

Many modifications and other embodiments of the disclosure set forth herein will be apparent having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A magnet wire comprising:
a conductor; and
at least one layer of polymeric enamel insulation formed around the conductor, the polymeric enamel insulation comprising a filler dispersed in a base polyamideimide material,
wherein the filler comprises between 15 percent and 35 percent by weight of silica dioxide and between 65 and 85 percent by weight of titanium dioxide,
wherein the polymeric enamel insulation has a thermal index of 235° C. or greater, and
wherein the polymeric enamel insulation has a first thermal conductivity that is at least twice that of a second thermal conductivity of the base polyimide material.

2. The magnet wire of claim 1, wherein the filler comprises between 15 percent and 35 percent by weight of the polymeric enamel insulation.

3. The magnet wire of claim 1, wherein the filler comprises between 20 percent and 30 percent by weight of the polymeric enamel insulation.

4. The magnet wire of claim 1, wherein the polymeric enamel insulation further comprises a Cymel additive.

5. The magnet wire of claim 1, wherein the at least one layer of polymeric enamel insulation comprises a plurality of layers of polymeric enamel insulation.

6. The magnet wire of claim 1, further comprising an unfilled topcoat insulation layer formed around the at least one layer of polymeric enamel insulation.

7. The magnet wire of claim 6, wherein the topcoat insulation layer comprises polyamideimide.

8. The magnet wire of claim 1, further comprising at least one basecoat layer formed between the conductor and the polymeric enamel insulation.

9. The magnet wire of claim 8, wherein the at least one basecoat layer comprises polyester.

10. The magnet wire of claim 1, further comprising:
at least one basecoat layer formed between the conductor and the polymeric enamel insulation; and
an unfilled topcoat insulation layer formed around the at least one layer of polymeric enamel insulation,
wherein the at least one layer of polymeric enamel insulation occupies at least 35 percent of the overall thickness of the at least one layer of polymeric enamel insulation, the at least one basecoat layer, and the unfilled topcoat insulation layer.

11. A magnet wire comprising:
a conductor; and
an insulation system formed around the conductor, the insulation system comprising:
basecoat insulation formed around the conductor, the basecoat insulation comprising polyester;
midcoat insulation formed around the basecoat insulation, the midcoat insulation comprising filled polymeric enamel insulation, the filled polymeric enamel insulation comprising between 15 percent and 35 percent by weight of a filler dispersed in a base polyamideimide material, the filler comprising between 20 percent and 80 percent by weight of silica dioxide and between 20 and 80 percent by weight of titanium dioxide; and
unfilled topcoat insulation formed around the midcoat insulation,
wherein the midcoat insulation occupies at least 35 percent of the overall thickness of the insulation system, and
wherein the insulation system has a thermal index of 235° C. or greater.

12. The magnet wire of claim 11, wherein the filled polymeric enamel insulation has a first thermal conductivity that is at least twice that of a second thermal conductivity for the base polyamideimide material.

13. The magnet wire of claim 11, wherein the filler comprises between 65 percent and 85 percent by weight of titanium dioxide and between 15 percent and 35 percent by weight of silica dioxide.

14. The magnet wire of claim 11, wherein the filler comprises between 20 percent and 30 percent by weight of the filled polymeric enamel insulation.

15. The magnet wire of claim 11, wherein the filled polymeric enamel insulation comprises a plurality of layers of filled polymeric enamel insulation.

16. The magnet wire of claim 11, wherein the unfilled topcoat insulation comprises unfilled polyamideimide enamel insulation.

17. A magnet wire comprising:
a conductor; and
an insulation system formed around the conductor, the insulation system comprising:
- base enamel insulation comprising a thermoset material having a thermal classification lower than that of polyamideimide;
- midcoat insulation comprising at least one layer of polymeric enamel insulation formed around the base insulation, the polymeric enamel insulation comprising a filler dispersed in a base polyamideimide material, the filler comprising between 15 percent and 35 percent by weight of silica dioxide and between 65 and 85 percent by weight of titanium dioxide; and
- unfilled topcoat insulation formed around the midcoat insulation, wherein the midcoat insulation occupies at least 35 percent of the overall thickness of the insulation system, and wherein the insulation system has a thermal index of 235° C. or greater.

18. The magnet wire of claim 17, wherein the filler comprises between 65 percent and 85 percent by weight of titanium dioxide and between 15 percent and 35 percent by weight of silica dioxide.

19. The magnet wire of claim 17, wherein the filler comprises between 20 percent and 30 percent by weight of the filled polymeric enamel insulation.

20. The magnet wire of claim 17, wherein the filled polymeric enamel insulation comprises a plurality of layers of filled polymeric enamel insulation.

* * * * *